INVENTOR
Charles A. Schreiber
BY Theodore M. Jablon
ATTORNEY

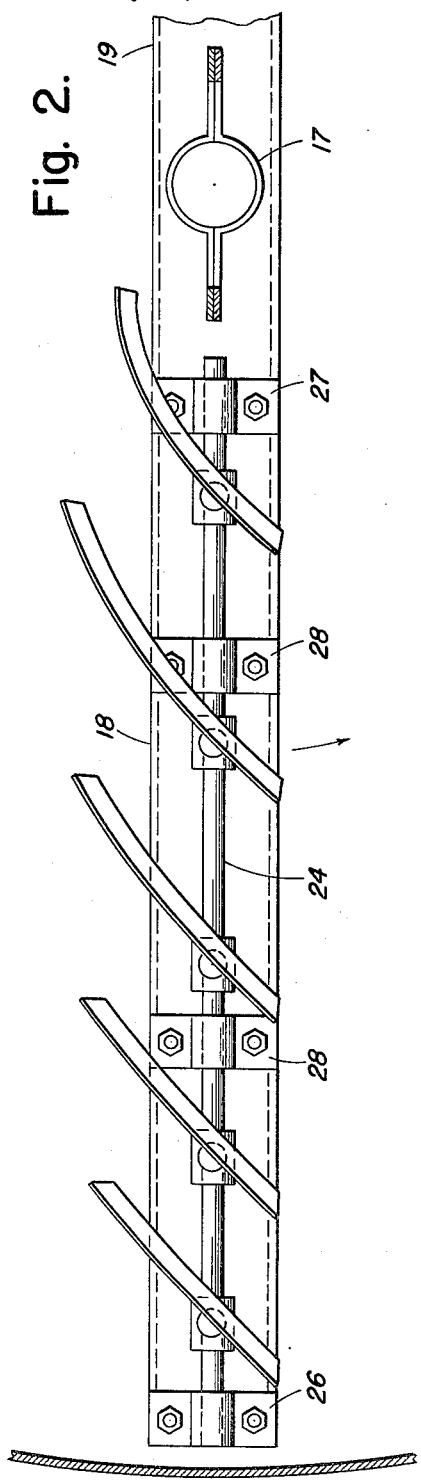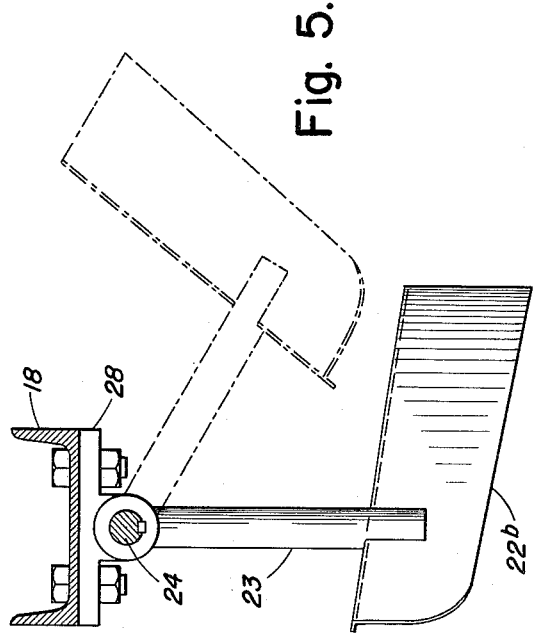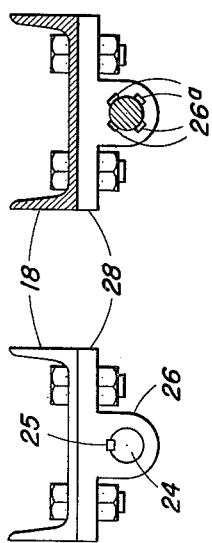

May 29, 1962  C. A. SCHREIBER  3,036,716
CONTINUOUSLY OPERATING SEDIMENTATION TANKS
Filed May 15, 1959  4 Sheets-Sheet 4
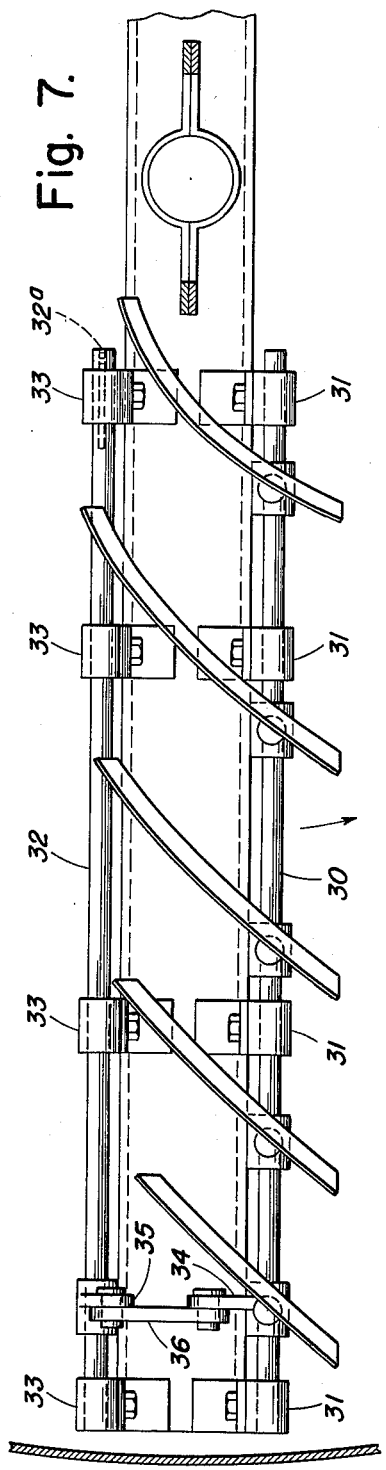
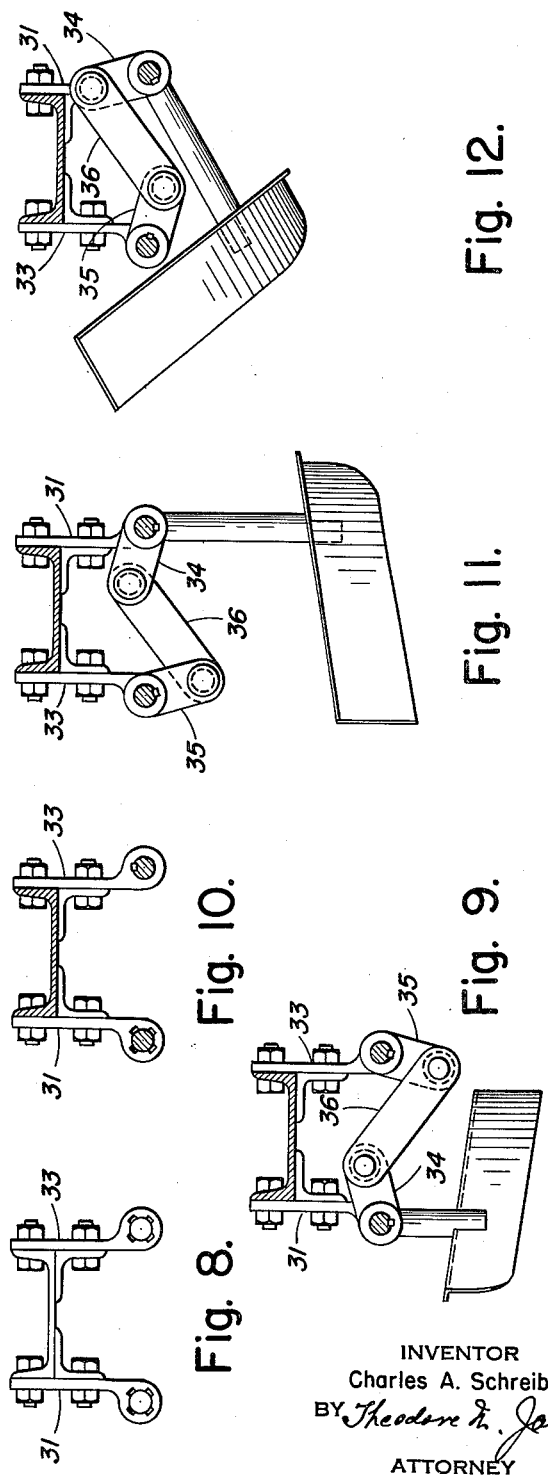
INVENTOR
Charles A. Schreiber
BY
ATTORNEY

United States Patent Office

3,036,716
Patented May 29, 1962

3,036,716
CONTINUOUSLY OPERATING SEDIMENTATION
TANKS
Charles A. Schreiber, Springdale, Conn., assignor to
Dorr-Oliver Incorporated, Stamford, Conn., a corporation of Delaware
Filed May 15, 1959, Ser. No. 813,545
4 Claims. (Cl. 210—528)

This invention relates to settling tanks which separate a slurry continuously fed thereto into supernatant overflowing liquid and a sediment or sludge.

More particularly, this invention relates to the sludge raking means which serve to continuously remove the sediment from the tank. The invention is embodied in the rotary type of sediment raking structure which is rotated about the vertical axis of the tank so that raking blades carried by the radial rake arms of the structure will convey the sludge over the tank bottom to the sludge outlet means.

It is a main object of this invention to provide a simple and foolproof arrangement of the raking blades upon the arms, whereby the blades will yield resiliently to excessive resistance or obstacles which may be encountered, for example in the way of excess sludge accumulations. According to the invention, the blades while yielding to the obstacle or accumulation are nevertheless kept biased against the sludge in such a manner to positively and effectively resolve the congestion incident to the continued rotation of the raking structure.

Accordingly, the arrangement is such that only the blades themselves will yield relative to the supporting arms of the structure, thereby avoiding the need for providing mechanism for bodily lifting the entire raking structure for the purpose of overcoming the congestion. Moreover, by being biased, the raking blades of this invention provide for a positive mode of operation which cannot be executed by those constructions where the raking blades are pivotally connected or hinged to the supporting arms and, therefore, lack the positive effect of bias provided for by this invention.

With the foregoing objects in view, the invention provides the aforementioned bias for the raking blades without the use of coil springs or the like which might get fouled and become inoperative in the sediment. Non-fouling operation is insured according to this invention by the provision of a simple torsion rod construction which is connected to the arm as well as to the raking blades, and which is capable of resilient torsional deformation in response to excess resistance or excess load imposed upon the blades. Thus, a torsion rod may be mounted co-extensive with the arm of the raking structure, with one end of the rod fixed and the other free relative to the arm, and a raking blade element associated with this torsion rod in such a manner that the blade element upon encountering excess sludge load or resistance during the rotation of the structure will yield from its normal raking position relative to the arm and away from the tank bottom to the extent that the torsion rod means are torsionally tensioned even while maintaining bias on the blade element or elements, which blade element will return to normal raking position upon removal of the load resistance simultaneously with the untensioning of the torsion rod.

According to one feature, at least two parallel torsion rods are cooperatively arranged in such a manner that the torsion responsiveness of the one rod is added to that of the other. This is accomplished by having the load acting upon one or more blade elements on one rod transmitted to the other rod. In this way, a maximum or cumulative torsion responsiveness may be accommodated upon a given length of raking arm.

Preferably the invention may be embodied in an arrangement in which the blade elements have rigid stems rigidly connected to a carrier rod which itself is free to rotate on the arm, the torque exerted by a loaded blade being transmitted from this carrier rod to the free end of a torsion rod extending parallel to the carrier rod and mounted jointly therewith upon the arm.

Other features and advantages will hereinafter appear.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings, in which:

FIG. 2 is an enlarged detail sectional view taken on line 2—2 of FIG. 1, showing the arrangement of a row of raking blade elements and the torsion rod arrangement from the underside thereof;

FIG. 3 is an end view upon one arm of the raking structure taken on line 3—3 of FIG. 1, showing the fixed end of the torsion rod;

FIG. 4 is a cross-section of the arm taken on line 4—4 of FIG. 1, showing a bearing arrangement for the torsion rod upon the arm;

FIG. 5 is a cross-section of the arm taken on line 5—5 of FIG. 1, showing the connection of a raking blade to the torsion rod according to one embodiment thereof;

FIG. 7 is a cross-sectional view taken on line 7—7 of FIG. 6, showing a bottom view of the blade arrangement and the associated torsion rods;

FIG. 8 is an end view of the arm taken on line 8—8 of FIG. 6, showing the associated loose ends of the two torsion rods;

FIG. 9 is a cross-section of the arm taken on line 9—9 of FIG. 6, showing one form of the torque transmitting means operatively inter-connecting the two torsion rods at the respectively loose ends thereof;

FIG. 10 is a similar cross-sectional view taken on line 10—10 of FIG. 6, showing the fixed end of one torsion rod adjacent to the loose end of the other;

FIG. 11 is a cross-section of the arm taken on line 11—11 of FIG. 6, showing one of the blade elements as well as the torque transmitting means between the rods in normal operating position;

FIG. 12 illustrates the operating condition where the blade element is displaced due to an overload, and maintained biased against the sediment through the torque transmitting means between the rods.

Figure 1:
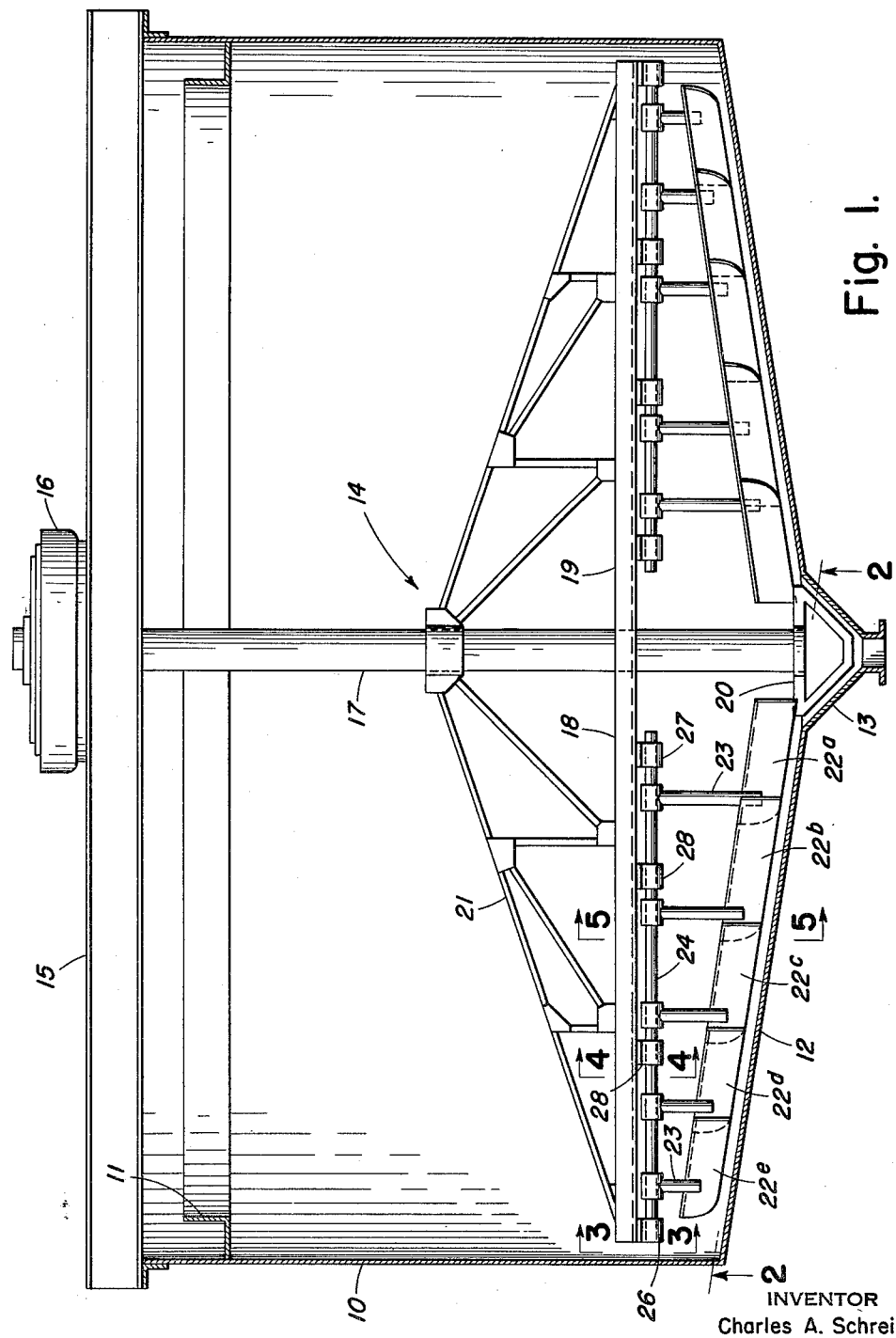
FIG. 1 is a vertical sectional view of a sedimentation tank showing the rotary raking structure in one embodiment of the invention employing a single torsion rod.
Figure 6:
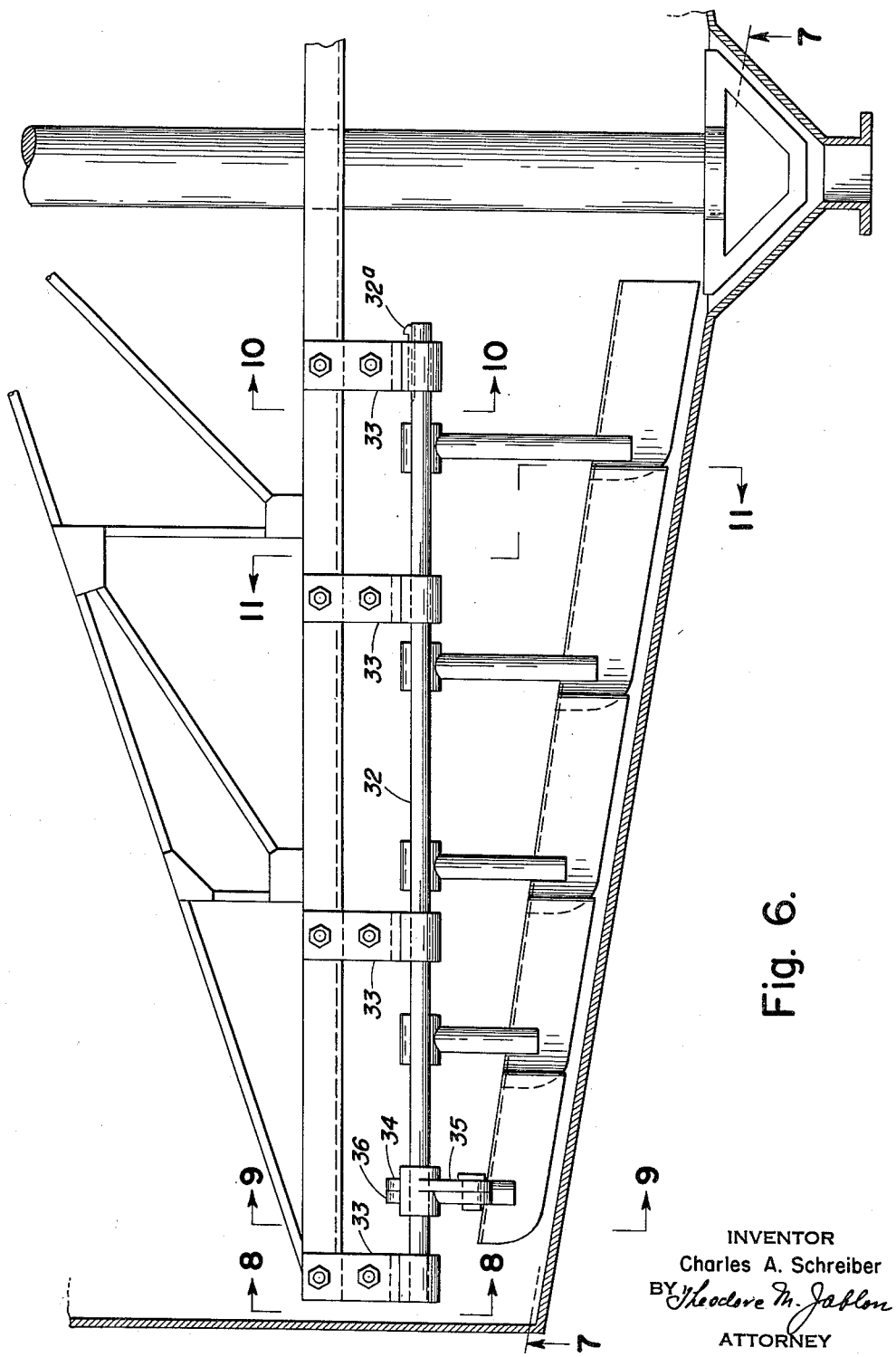
FIG. 6 is an enlarged side view of a portion of the raking structure illustrating the cumulative torsional effect obtainable from a plurality of operatively interconnected parallel torsion rods.

As illustrated in the drawings and by way of example, the invention is herein shown in connection with the type of sedimentation apparatus which comprises a tank having a peripheral overflow launder, a shallow bottom with a central sludge discharge outlet means, and a rotary sediment raking structure supported from a transverse overhead construction or bridge extending diametrically across the top of the tank, and driven by a mechanism mounted on the overhead construction.

Therefore, according to the embodiment in FIGS. 1–5, the sedimentation apparatus comprises a tank 10 having an overflow launder 11 at the top, a shallow conical bottom 12 wtih a central sludge discharge cone or sump 13. A rotary raking structure 14 embodying the invention is supported from a pair of parallel structural beams 15, to rotate about the vertical axis of the tank, a drive mechanism 16 being mounted on these beams whereby the raking structure is rotatably supported. Such a drive mechanism may be of the kind shown in the patent to Scott No. 2,807,725 wherein the vertical shaft of the rotary raking structure has connected therewith a worm gear or the like turnable on an annular vertical thrust ball bearing, and including antitilting means confining the top side of the gear against displacement from any transverse forces acting upon the vertical shaft of the raking structure. Suitable conventional feedwell means, here not particularly shown, may be provided around the central vertical axis of the tank for continuously introducing a slurry or feed mixture of liquid and solids into the tank. As a result of such continuous feeding, supernatant liquid will overflow into the launder 11, while the solids settle to the bottom, the heavier constituents settling closer to the center and the lighter particles settling correspondingly further away therefrom in respective concentric bottom zones.

The raking structure embodying the invention according to the example in FIG. 1 comprises a vertical shaft 17 connected to the aforementioned drive gear of the drive mechanism although axially non-shiftable with respect thereto. A pair of rake arms 18 and 19 extend rigidly in opposite directions from the shaft which also carries at its lower end a center scraper 20 operating in the sludge discharge cone 13. The arms 18 and 19 are herein shown to be in the form of structural beams of channel shaped profile arranged with the back of the channel facing downwardly, the arms being reinforced by bracing structure 21. These rake arms are spaced from the tank bottom a sufficient distance for accommodating an arrangement of raking blade elements 22 which have each a stem 23 extending rigidly from the blade element and yieldable angularly due to the provision of a torsion rod arrangement mounted on the underside of the arm.

According to this embodiment of the invention, the torsion rod arrangement comprises a single torsion rod 24 co-extensive with the respective arm of the raking structure and constructed so as to be torsionally resiliently deformable in response to excessive load from sediment accumulation or other resistances encountered by one or more of the blade elements which are spaced from the torsion rod by the stems.

In this example, the torsion rod 24 has its outer end fixed relatively to the arm by way of being keyed as at 25 (FIG. 3) to a bearing member 26 which in turn is bolted to the underside of the arm. The opposite or inner end of this torsion rod 24 is free to turn in an inner bearing member 27 similarly fixed to the arm. A suitable number of intermediate bearing members 28 may be further provided for this torsion rod and similarly fixed to the arm. Preferably, the bearing members, as noted in FIG. 4, have relieved bearing surface portions 26a to prevent binding of the torsion rod in the bearing members, or to free itself of solid particles from the suspensions.

In the operation, for example, if an excessive load accumulation or resistance is encountered by the innermost of the blade elements on the arm, torque exerted through the respective stems will twist the torsion rod in its bearing members 27 and 28 to the extent permitted by its resilient torsional deformation, being fixed only in the outer end bearing 26.

With the central shaft 17 resisting upward axial displacement, the torsional deformation or twisting of the torsion rod 24 as illustrated in FIG. 5 will exert bias upon the respective raking blade element thereby maintaining this blade element in pressure contact with the sediment or sludge. Thus, when the respective blade element is displaced incident to the angular yielding movement of the stem, the then lower leading end portion of the blade element due to such bias will be caused to dig sharply into the accumulation thereby tending to positively and effectively remove the same. In this way, with the blade element or elements in displaced although biased condition, the then lower leading end portion of the blade element engages the denser and heavier strata of the sediment accumulation while the then higher trailing end portion of the blade element is relatively relieved being in contact only with the superjacent strata of less dense and, therefore, lighter sediment. At the same time, while the raking structure continues its rotation imparted by the drive mechanism 16, the center scraper 20 will continue operating in the sludge discharge cone 13 to help remove the congestion, inasmuch as the raking blades themselves are yieldable relative to the arms, whereas the rake structure as a whole will resist upward axial displacement.

Consequently, while yielding to the accumulation, the blade elements will gradually reduce the accumulation and resolve the congestion without undue overload on the blades and on the rake structure and on the drive mechanism as a whole, until they will have again reached their normal operating position.

According to FIGS. 6–12, the invention is embodied in a rotary rake structure generally resembling the one shown in the embodiment of FIGS. 1–5, although providing a different torsion rod arrangement whereby relatively greater torsional deformation and yieldability of the raking blades is attainable by the co-action of at least a pair of torsion rods mounted to provide cumulative torsional deformation.

Accordingly, a first torsion rod 30 herein also termed the carrier rod for the raking blade elements is mounted freely in a row of bearing members 31 which are rigidly connected to one side or flange of the channel shape of the respective rake arm. Again, the blade elements through respective stems are originally connected to this torsion rod. A second torsion rod 32 is mounted in a row of bearing members 33 fastened or bolted to the opposite flange of the channel shape of the respective arm and arranged substantially symmetrical to the bearing members 31 of the first torsion rod. The inner end portion of this second torsion rod 32 is fixed relative to the respective arm being keyed by key connection 32a in the end bearing member closest to the center shaft of the raking structure whereas the free outer end portion of this second torsion rod near the outermost bearing member is connected to the adjacent end portion of the first torsion rod 30 by way of torque transmitting means whereby the torque arising from excess load encountered for example by the innermost blade element, is transmitted from the first to the second torsion rod. In this way, the cumulative length of both torsion rods is made available to provide for a desired degree of torsional deformation in these rods corresponding to the angular displacement of the stem of the blade element as from the position of FIG. 11 to the position of FIG. 12 in case of excess accumulation or resistance encountered by the raking blade.

Whereas other forms of torque transmitting means may be employed, the present embodiment provides preferred linkage means comprising a first actuator arm 34 rigidly extending from the upper end of the stem of the outermost blade, a second actuator arm 35 extending rigidly from the near end portion of the second torsion rod, and a link member 36 interconnecting the actuator arms 34 and 35. The manner in which this linkage arrangement transmits the torque from the first torsion rod to the next within a given length of the raking arm supporting them, is illustrated in FIGS. 11 and 12. Again, because of the resilient character of the torsional deformation of the torsion rod arrangement, a blade element encountering an excessive resistance or obstacle, for example the innermost blade element or the one next to it or both blade elements will yield accordingly even though remaining biased against the sediment, so that the then lower trailing end portions of the blade or blades will dig sharply into the accumulation and thus operate to positively and effectively remove the congestion with continued rotation of the raking structure, this removal being aided by the continual operation of the center scraper which remains operative in the sludge discharge cone inasmuch as the vertical shaft of the raking structure resists upward axial displacement.

Whereas there have been illustrated actuator arms of equal length, it is to be understood that force increasing or multiplying torque transmitting effects may be applied, for example by force increasing leverage of the actuator arms, or by toggle link effect. In this way there is attainable a relatively greater angular yielding movement of the stems of the blade elements.

It will also be understood that the invention lends itself to being embodied in a rotary raking structure irrespective of whether that structure is of the kind that conveys the sediment inwardly to a control outlet means or outwardly to a peripheral zone of collection and discharge.

As this invention may be embodied in several forms without departing from the spirit of essential characteristics thereof, the present embodiment is, therefore, illustrative and not restrictive, since the scope of the invention is defined by the appended claims rather than by the description preceding them, and all changes that fall within meets and bounds of the claims, or equivalence of such meets and bounds are, therefore, intended to be embraced by the claims.

In the claims:

1. In a sediment raking structure for sedimentation tanks, having a central portion rotatable about a vertical axis, a yieldable raking blade arrangement comprising a supporting arm extending radially from said central portion to rotate therewith; a raking blade element having a stem rigidly connected therewith; and means for yieldably supporting said blade element from said arm, comprising a torsion rod co-extensive with said arm and having one end free and the other end fixed relative to the arm for resilient torsional deformation of the rod; a carrier rod parallel to said torsion rod with means for mounting the same so as to be bodily turnable on said arm and to which said stem is fixed; torque transmitting means operatively interconnecting the free end of the torsion rod and the adjacent free end of the carrier rod for torsionally deflecting and tensioning said torsion rod by the angular movement of said stem whereby said blade element upon encountering excess resistance during rotation of said structure is adapted to yield from its normal raking position relative to the arm and away from the tank bottom at least to the extent that said torsion rod is torsionally deflected and tensioned by the effect of said resistance upon said blade element while maintaining bias on said blade element in pressure engagement with the sediment, and is adapted to return to said normal raking position upon removal of said load resistance simultaneously with the untensioning of said torsion rod.

2. In a sediment raking structure for sedimentation tanks, having a central portion rotatable about a vertical axis, a yieldable raking blade arrangement comprising a supporting arm extending radially from said central portion to rotate therewith; a raking blade element having a stem rigidly connected to said blade element; and means for yieldably supporting said blade element on said arm, comprising a first torsion rod mounted on said arm co-extensive therewith and having one end fixed and the other end free relative to said arm to allow for resilient torsional deformation of the rod; a second torsion rod parallel to said first torsion rod with means for mounting the same so as to be bodily turnable on said arm and to which said stem is rigidly connected, and torque transmitting means operatively interconnecting the free end of said first torsion rod with the adjacent free end of the second torsion rod transmitting thereto torque from the second rod so that angular movement of said stem will torsionally tension both of said rods, whereby said blade element upon encountering excess resistance during rotation of said structure is adapted to yield from its normal raking position relative to the arm and away from the tank bottom at least to the extent that said torsion rods are torsionally tensioned by the effect of said resistance upon said blade element while maintaining bias on said blade element in pressure engagement with the sediment, and is adapted to return to said normal raking position upon removal of said load resistance simultaneously with the untensioning of said stringer rod.

3. In a sediment raking structure for sedimentation tanks, having a central portion rotatable about a vertical axis, a yieldable raking blade arrangement comprising a supporting arm extending radially from said central portion to rotate therewith; a raking blade element having a stem rigidly connected to said blade element; and means for yieldably supporting said blade element on said arm, comprising a first torsion rod mounted on said arm co-extensive therewith so as to have one end fixed and the other end free for resilient torsional deformation, a second torsion rod mounted on said arm parallel to said first torsion rod so as to be bodily turnable on said arm, to which said stem is rigidly connected, a first actuator arm fixed to the free end of the first torsion rod, a second actuator arm fixed to the adjacent free end of the second torsion rod, and torque transmitting linkage means operatively interconnecting said actuator arms so that angular movement of said stem will torsionally tension both said rods, whereby said blade element upon encountering excess resistance during rotation of said structure is adapted to yield from its normal raking position relative to the arm and away from the tank bottom at least to the extent that said torsion rods are torsionally tensioned by the effect of said resistance upon said blade element while maintaining bias on said blade element in pressure engagement with the sediment, and is adapted to return to said normal raking position upon removal of said load resistance simultaneously with the untensioning of said torsion rod.

4. A sediment raking structure for sedimentation tanks, having a central vertical portion rotatable about a vertical axis, with a supporting arm extending radially and rigidly from said central portion to rotate therewith, and raking blade elements each including a blade member and a stem, and with mounting means for yieldably attaching said stems to said supporting arm to allow said blade elements to yield upon encountering excess sediment resistance during the rotation of said structure, said mounting means comprising a horizontal torsionally elastic rod attached to said arm at the underside thereof and co-extensive therewith with one end of said rod being restrained against torsion on said arm and the other end pivotally free for substantial torsional elastic deformation of the rod in response to a torsional force applied thereto while said rigid supporting arm remains torsionally unaffected, and that the stems are secured to said torsion rod against rotational displacement relative thereto when excess sediment is encountered by the blade elements, said stems extending downwardly with the blade elements connected to the lower end thereof, so that angular movement of said stems will deflect and torsionally tension said torsion rod, whereby said blade elements upon encountering excess sediment resistance during rotation of said structure are adapted to yield from normal raking position relative to said arm and away from the tank bottom to the extent that said torsion rod is torsionally deflected and tensioned by said resistance while maintaining pressure engagement with the sediment, said blade elements adapted to return to said normal raking position upon removal of said load resistance simultaneously with the untensioning of said torsion rod.

References Cited in the file of this patent

UNITED STATES PATENTS

| | | |
|---|---|---|
| 2,051,149 | Nordell | Aug. 18, 1936 |
| 2,122,385 | Scott | June 28, 1938 |
| 2,585,006 | Graner et al. | Feb. 12, 1952 |
| 2,611,489 | Scott | Sept. 23, 1952 |
| 2,881,923 | Nelson | Apr. 14, 1959 |

FOREIGN PATENTS

| | | |
|---|---|---|
| 417,473 | Great Britain | Oct. 5, 1934 |
| 516,055 | Germany | Jan. 17, 1931 |